(12) United States Patent
Kimura

(10) Patent No.: US 8,827,458 B2
(45) Date of Patent: Sep. 9, 2014

(54) PROJECTION TYPE IMAGE DISPLAY APPARATUS INCLUDING CLUSTER OF EXCITATORY LIGHT SOURCES

(75) Inventor: Nobuyuki Kimura, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 286 days.

(21) Appl. No.: 13/088,016

(22) Filed: Apr. 15, 2011

(65) Prior Publication Data

US 2012/0019786 A1    Jan. 26, 2012

(30) Foreign Application Priority Data

Jul. 21, 2010 (JP) ................................. 2010-163478

(51) Int. Cl.
*G03B 21/00* (2006.01)
*G03B 21/14* (2006.01)
*H04N 9/31* (2006.01)
*G03B 21/20* (2006.01)

(52) U.S. Cl.
CPC .............. *H04N 9/3197* (2013.01); *G03B 21/14* (2013.01); *H04N 9/3155* (2013.01); *G03B 21/2066* (2013.01); *G03B 21/204* (2013.01); *H04N 9/3194* (2013.01); *G03B 21/2053* (2013.01); *G03B 21/20* (2013.01)
USPC .............................................. 353/31; 353/84

(58) Field of Classification Search
USPC ...................... 353/84; 359/231, 259; 356/418
See application file for complete search history.

(56) References Cited

U.S. PATENT DOCUMENTS

| 2007/0019408 A1* | 1/2007 | McGuire et al. | 362/231 |
| 2008/0273123 A1* | 11/2008 | Morikawa et al. | 348/757 |
| 2009/0284148 A1 | 11/2009 | Iwanaga | |
| 2011/0043764 A1* | 2/2011 | Narikawa | 353/31 |

FOREIGN PATENT DOCUMENTS

| JP | 2003-215818 A | 7/2003 |
| JP | 2008-118001 | 5/2008 |
| JP | 2009-277516 | 11/2009 |
| JP | 2010-086815 | 4/2010 |

\* cited by examiner

*Primary Examiner* — Georgia Y Epps
*Assistant Examiner* — Danell L Owens
(74) *Attorney, Agent, or Firm* — McDermott Will & Emery LLP

(57) ABSTRACT

A projection type image display apparatus using a light source where excitatory light makes fluorescent material to emit fluorescent light is provided with improved lifetime of a fluorescent material light source without increasing in the apparatus size, The apparatus comprises an excitatory light source cluster, a substrate on which fluorescent material is arranged, light intensity detectors measuring the intensities of the excitatory light and the fluorescent light, a control device which judges based on the measured values of the light intensity detectors whether or not to move the substrate, and a motion device which moves the substrate. The control device may issue an instruction to move the substrate when the ratio of the decrease in the fluorescent light intensity to that in the excitatory light intensity exceeds a prescribed value. Also, the substrate may be moved in a direction perpendicular to the direction of the excitatory light optical axis.

18 Claims, 3 Drawing Sheets ic material
PROJECTION TYPE IMAGE DISPLAY APPARATUS INCLUDING CLUSTER OF EXCITATORY LIGHT SOURCES

INCORPORATION BY REFERENCE

The present application claims priority from Japanese application JP-2010-163478 filed on Jul. 21, 2010, the content of which is hereby incorporated by reference into this application.

BACKGROUND OF THE INVENTION

The present invention pertains to a projection type image display apparatus.

In the concerned technical field, there is proposed a light source apparatus emitting light with high efficiency even if the excitatory light emitted from a solid light source is visible light (JP-A-2009-277516). In JP-A-2009-277516, by irradiating visible light, which has lower energy than ultraviolet, on fluorescent materials as the excitatory light and using the fluorescent materials arranged on a rotationally controlled, circular disc substrate, it is avoided that the excitatory light is irradiated on one spot of the fluorescent material.

SUMMARY OF THE INVENTION

According to JP-A-2009-277516, the excitatory light is still continually irradiated on a circular path of the disc substrate and it is insufficient as the improvement in the lifetime of the fluorescent material. Further, if the excitatory light is irradiated on a position far from the center of the rotation, it is possible to increase the actual area of irradiation; however, there rises a problem that the size of the disc substrate becomes larger and the apparatus increases in size as well.

Accordingly, it is an object of the present invention to furnish a projection type image display apparatus for which the lifetime of the light source using fluorescent material is improved without an excessive increase in the size of the apparatus.

In order to solve the aforementioned problems, one preferable mode of the present invention is as follows.

The aforementioned projection type image display apparatus comprises: a cluster of excitatory light sources emitting excitatory light; a substrate on which a fluorescent material to emit fluorescent light by irradiation of the excitatory light is arranged; a first light intensity detector measuring the intensity of the excitatory light; a second light intensity detector measuring the intensity of the fluorescent light; a control device judging whether the substrate is to be moved or not based on the measured values of the first and second light intensity detectors; and a motion device moving the substrate in response to an instruction from the control device.

Other objects, features, and advantages of the invention will become apparent from the following description of the embodiments of the invention taken in conjunction with the accompanying drawings.

DESCRIPTION OF THE EMBODIMENTS

Figure 1A:
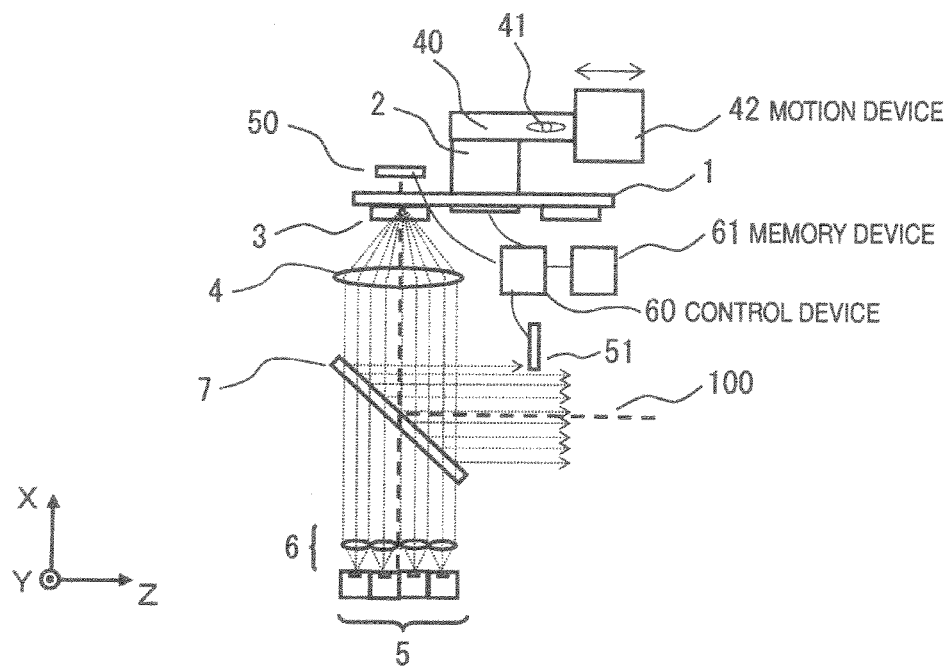
FIGS. 1A, 1B, and 1C are diagrams showing a part of an illumination optic system of the present embodiment.

Hereinafter, an explanation of the present embodiment is given with reference to the drawings. Further, in each diagram, like reference numerals are used to designate like parts and explanations are omitted regarding what have once been explained.

Here, a right-handed, orthogonal coordinate system is introduced. From the left to the right in a plane of the page is taken to be the Z axis, which falls on the direction of the light on the optical axis 100 in each figure; an axis that is in a plane normal to the Z axis and parallel with the page is taken to be the X axis and an axis that is directed from the back of the page to the front is taken to be the Y axis. (However, regarding FIGS. 1B, 1C, and 3B, the axis directed from the front of the page to the back is taken to be the X axis.) The direction parallel with the X axis is called the "X direction", the direction parallel with the Y axis is called the "Y direction", the direction parallel with the Z axis is called the "Z direction", polarized light with a polarization orientation in the X direction is called "X-polarized light", and polarized light with a polarization orientation in the Y direction is called "Y-polarized light".

Figure 3A:
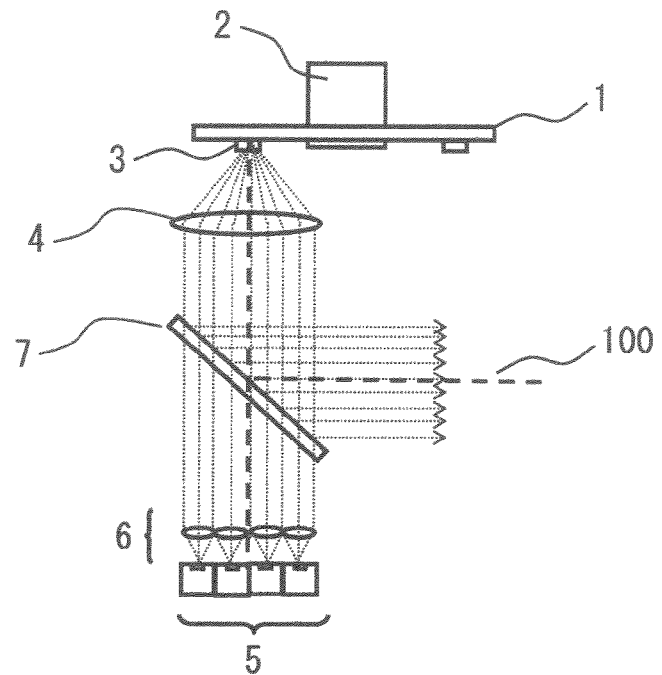
FIGS. 3A and 3B are diagrams showing a part of an illumination optic system of the prior art.
Figure 3B:
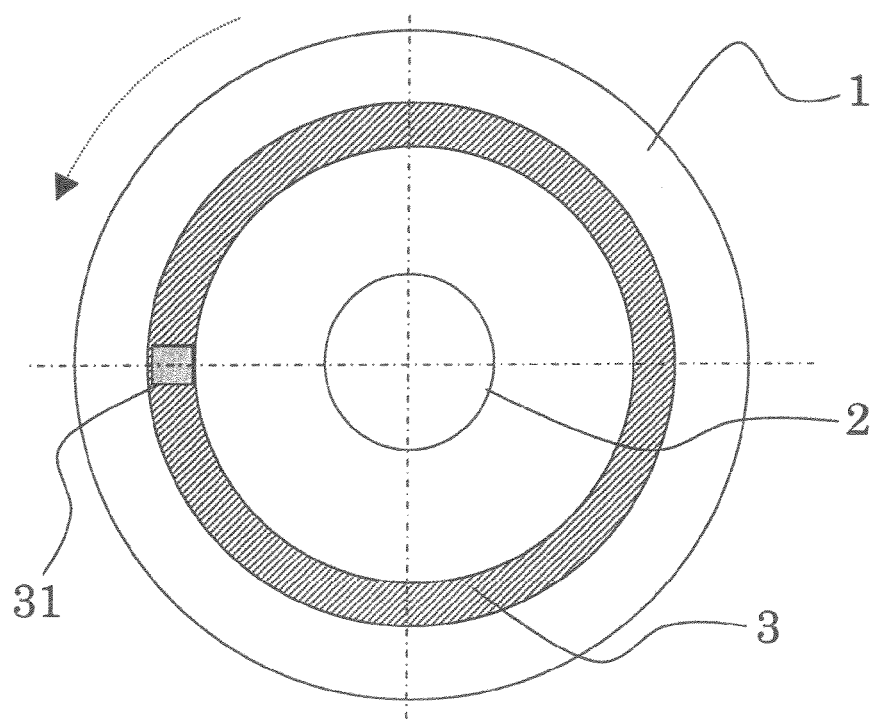

First, in order to make it easy to understand the difference between the present embodiment and the prior art, an explanation is given regarding the prior art (JP-A-2009-277516). FIGS. 3A and 3B are diagrams showing a part of an illumination optic system of the prior art.

In FIG. 3A, the excitatory light emitted from an excitatory light source cluster 5 becomes substantially collimated light by a collimating lens cluster 6 and impinges on a dichroic mirror 7. The dichroic mirror 7 has the characteristic of transmitting light in the wavelength range around the excitatory light but reflecting light in the wavelength range around the fluorescent light. Accordingly, the excitatory light passes through the dichroic mirror 7 and, after passing through a condenser lens 4, impinges on a disc substrate 1 on which a fluorescent material 3 is applied. The curvature of the condenser lens 4 is set to focus the incident collimated light to one spot on the disc substrate 1.

The disc substrate 1 is a circular substrate of which a rotation can be controlled with a rotary element 2 arranged at the center axis. The fluorescent material 3 on the disc substrate 1 is excited by the excitatory light to emit fluorescent light towards the condenser lens 4. After passing through the condenser lens 4, the fluorescent light becomes substantially collimated, is reflected in the dichroic mirror 7, and travels toward a projection lens.

In FIG. 3B, the excitatory light is focused on an irradiation area 31 on the disc substrate 1. In order to prevent the excitatory light from being continuously focused on one spot of the fluorescent material 3, the disc substrate 1 rotates around the axis of the rotary element 2. Comparing with the case where the excitatory light is continuously focused on one spot of the fluorescent material 3 (without any rotation of the disc substrate 1), a full circular path on the disc substrate 1 becomes the illumination area and the lifetime of the fluorescent material is improved.

Figure 1B:
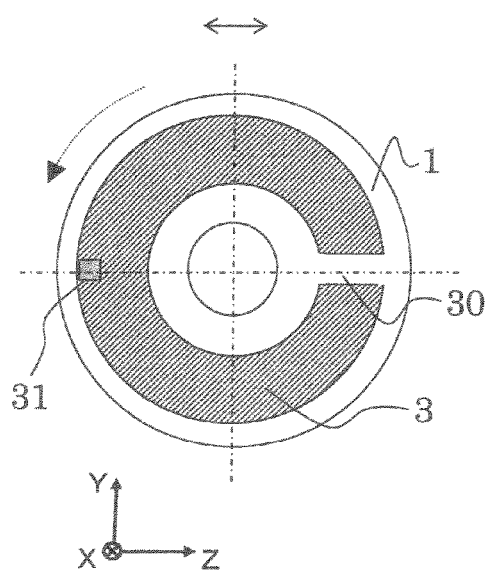
Figure 1C:
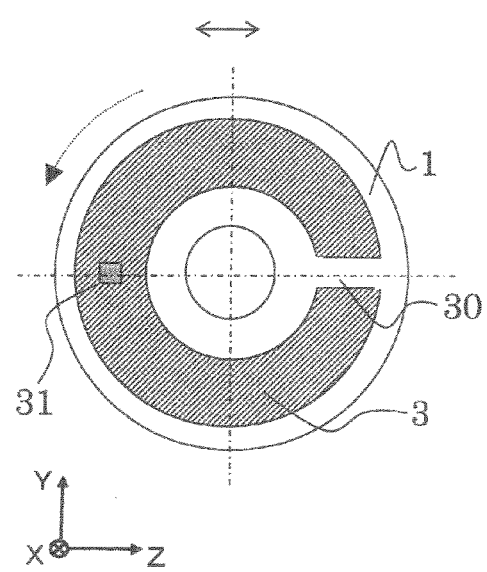

Next, an explication is given regarding the present embodiment. FIGS. 1A, 1B, and 1C are diagrams showing a part of an illumination optic system of the present embodiment. Further, in the present embodiment, an "illumination optic system" is taken to indicate the portion of FIG. 2 excluding a projection lens 22 and a screen 120.

In FIG. 1A, irradiation of excitatory light emitted from an excitatory light source cluster 5 makes the fluorescent material 3 emit fluorescent light which travels toward the projection lens in the same way as in the explanation for FIG. 3A.

A disc substrate 1 is a circular substrate of which a rotation can be controlled with a rotary element 2 at the center axis and is connected, via a coupling part 40, with a motion device 42 that can move the disc substrate 1 in the Z direction. In the coupling part 40, there is a hole, through which a positioning pin 41 is put. Accordingly, a control device 60 can move the disc substrate 1 in the Z direction by operating the motion device 42.

At the back of the disc substrate 1, there is arranged a first light intensity detector 50 measuring the intensity of the excitatory light emitted from the excitatory light source cluster 5. Also, in order to measure the intensity of the excitatory light at the back of the disc substrate 1, the substrate of the disc substrate 1 is made of transparent material and is provided with an area on which no fluorescent material is arranged (non-fluorescent area 30). Further, on the side of the dichroic mirror 7 toward the projection lens, there is arranged a second light intensity detector 51 measuring the intensity of the fluorescent light.

Each of the first light intensity detector 50 and the second light intensity detector 51 transmits the light intensity monitoring result to the control device 60. The control device 60 judges whether to move the disc substrate 1 or not based on the received monitoring results.

Accompanying an actual use of the projection type image display apparatus, both the excitatory light source and the fluorescent material gradually degrade so that output brightness of the projection type image display apparatus decreases. In the case where the excitatory light source is degraded, since the excitatory light output decreases, the output of the fluorescent light emitted due to excitation also decreases in proportion to the decrease of the excitatory light intensity so that the brightness of the projection type image display apparatus decreases. Also, even in the case where only the fluorescent material degrades, the output of fluorescent light decreases so that the brightness of the projection type image display apparatus decreases.

In the case where the degradation of the fluorescent material is great, the decrease in the intensity of the fluorescent light is detected to be greater compared with the decrease in the intensity of the excitatory light. Accordingly, the control device 60 judges that the disc substrate 1 shall be moved when the ratio of the decrease in the intensity of the fluorescent light with respect to the decrease in the intensity of the excitatory light exceeds a prescribed value.

Next, the control device 60 moves the disc substrate 1 in the Z direction to the extent of the size of irradiation area (e.g. 1 to 2 mm). For example, when the width of the fluorescent material 3 is 10 mm and the size of the irradiation area is 2 mm, there are five positions where the excitatory light can irradiate (the number of moves works out to be four). That is, the lifetime becomes approximately five times as great as that when there is no movement of the disc substrate 1 in the Z direction (JP-A-2009-277516).

A memory device 61 stores the width of the fluorescent material 3, the size of the irradiation area, the radial coordinates of the current irradiation area, and the like, and the control device 60 issues an instruction to the motion device 42 to move the disc substrate 1 based on these pieces of information. When it judges that there is no position to move the disc substrate to next, it may notify of a user via a user interface that the disc substrate 1 to be exchanged.

Further, the control device 60 continuously rotates the disc substrate during operation of the projection type image display apparatus (during laser irradiation). It is because, since the excitatory light used here has high wattage (20 to 30 W), the silicone adhesive attaching the fluorescent material to the substrate ends up getting burnt in an instant if heat ends up being concentrated to one position on the disc without rotation. Since the disc substrate is continuously rotated, the irradiation area passes through a fluorescent-material-free area 30 once per revolution. Consequently, measurement of the intensity of the excitatory light with the first light intensity detector 50 is ascertained.

FIG. 1B shows the state in which the fluorescent material 3 is arranged to the disc substrate 1. On the surface of the disc substrate 1, there is an area (designated as a hatched area) onto which the fluorescent material 3 is arranged and there is an irradiation area 31 within the fluorescent material 3; further, there is provided the fluorescent-material-free area 30 onto which the fluorescent material 3 is not arranged. When the disc substrate 1 rotates and the irradiation area 31 passes through the fluorescent-material-free area 30, the first light intensity detector 50 measures the intensity of the excitatory light. In order to prevent a decrease in the light flux quantity, it is preferable for the fluorescent-material-free area 30 to have approximately the same width as the irradiation area 31.

FIG. 1C shows an example of a case where the position of the disc substrate is moved in the Z direction. The width in the radial direction of the area onto which the fluorescent material 3 is arranged is the size for which a plurality of irradiation areas 31 can be accommodated in the radial direction. By moving the position of the disc substrate by a size having approximately the same as the irradiation area 31, the fluorescent material can be irradiated in areas different from the area of degraded fluorescent material so that the output power of the fluorescent light can be increased and brightness can be recovered. That is, its lifetime as a light source can be improved.

Further, the position of the first light intensity detector 50 is at the back of the disc substrate 1 and the position of the second light intensity detector 51 is at the back of the dichroic mirror; however, as far as they are at the positions where the intensities of the excitatory light and the fluorescent light can be measured, they are not limited to these positions. Further, as for the direction in which the disc substrate is moved, as well, it is not limited to the Z direction, as far as it is a direction in which areas in which the fluorescent material 3 is degraded can be avoided.

In the aforementioned embodiment, an explanation is given in which the object of applying the fluorescent material is a disc substrate; it is not limited to a disc substrate, however, and, for example, a polygon-shape substrate is also acceptable.

Figure 2:
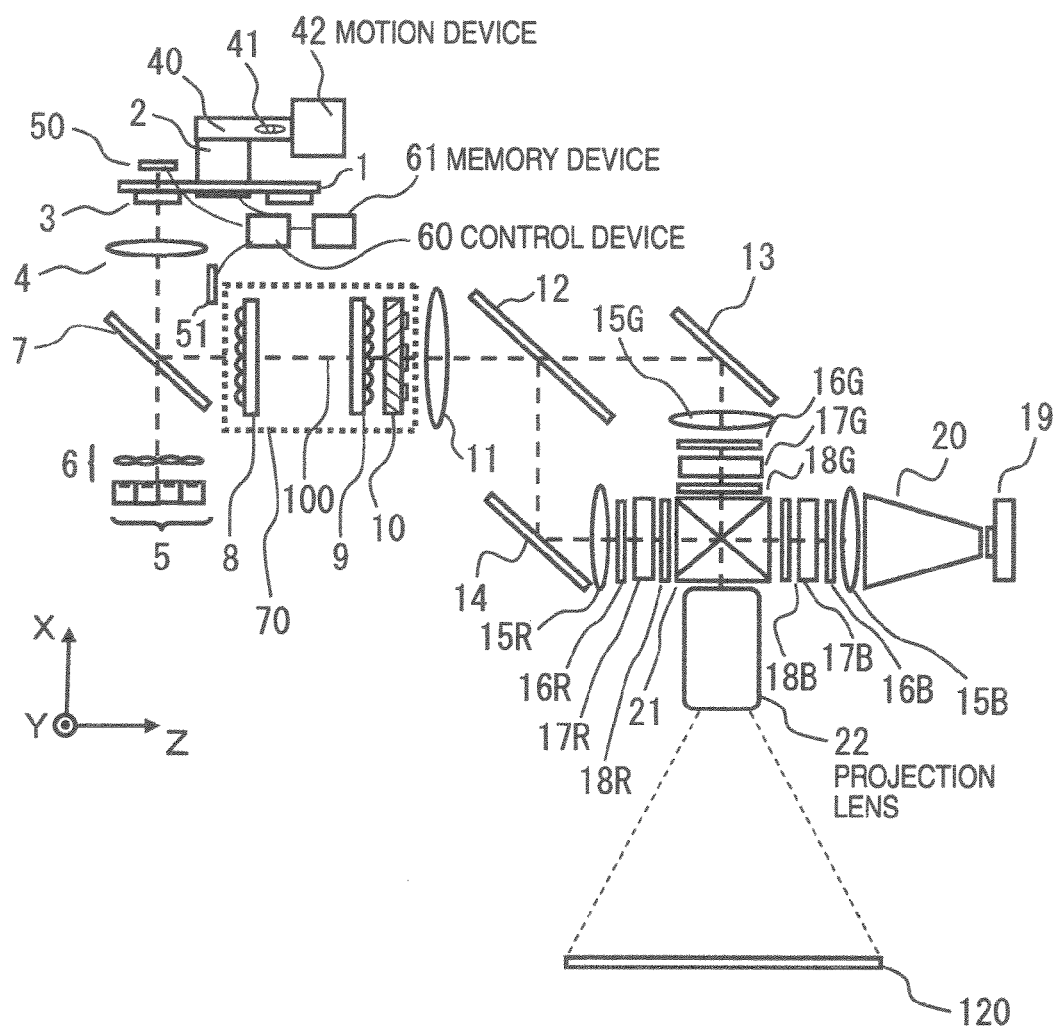
FIG. 2 is a schematic configuration diagram of the optic system of the projection type image display apparatus.

Next, an explanation is given regarding an illumination optic system of the projection type image display apparatus. FIG. 2 is a schematic configuration diagram of the optic system of the projection type image display apparatus. To distinguish the elements arranged in the optical path of the light of each color, the indications are given with "R", "G", and "B" attached after the reference numerals designating the color of light; when it is not necessary to make a distinction, the light color index is omitted.

First, the principle on which red light and green light are irradiated with uniform illuminance on liquid-crystal-type image display elements 17R and 17G is explained.

As an excitatory light source, blue lasers are used since a laser has a small emission area as the source of light and focusing and collimation of the light are simple. Blue excitatory light emitted from the excitatory light source cluster 5 becomes substantially collimated by the collimating lens cluster 6 and impinges on the dichroic mirror 7. The dichroic mirror 7 has a characteristic of transmitting blue light and reflecting green light and red light. Consequently, the blue excitatory light passes through the dichroic mirror 7, is focused with the condenser lens 4, and is focused on the disc substrate 1. After being emitted from the disc substrate 1, a yellow light, which contains green light and red light, generated with the yellow-color fluorescent material 3 passes through the condenser lens 4 to become collimated, is reflected by the dichroic mirror 7, and impinges on a polarization conversion integrator 70.

The polarization conversion integrator 70 includes: an optical integrator composed of a first lens cluster 8 and a second lens cluster 9 to carry out uniform illumination; and a polarization conversion element 10, which comprises made of a polarizing beam splitter array and a half-wave plate to line up the polarization orientations of the light in a prescribed polarization orientation to convert into linearly polarized light. The light from the second lens cluster 9 is substantially lined up, by the polarization conversion element 10, to linearly polarized light in a prescribed polarization orientation, for example in the Y direction. And then, the projected images of respective lens cells of the first lens cluster 8 are superposed by a condenser lens 11 and collimating lenses 15R and 15G on each of liquid-crystal-type image display elements 17R and 17G, respectively.

At that point, the yellow light passing through the condenser lens 11 is separated into red light and green light by a dichroic mirror 12. The dichroic mirror 12 has a characteristic of transmitting green light and reflecting red light. Therefore, out of the yellow light incident on the dichroic mirror 12, the green light passes through the dichroic mirror 12, is reflected on a reflecting mirror 13, and becomes substantially collimated through the collimating lens 15G; X-polarized light has further been removed with an incident side polarizer plate 16G and the green light impinges on the liquid-crystal-type image display element 17G. On the other hand, the red light is reflected on the dichroic mirror 12, is reflected on a reflection mirror 14, and becomes substantially collimated through the collimating lens 15R; X-polarized light has further been removed with an incident side polarizer plate 16R and the red light impinges on the liquid-crystal-type image display element 17R.

By proceeding in this way, it is possible to irradiate uniformly the liquid-crystal-type image display elements while lining up the lights from excitatory light source cluster 5, which is random in its polarization orientation, in a prescribed polarization orientation (here, Y-polarized lights).

Next, the principle of how blue light is irradiated with uniform illuminance on a liquid-crystal-type image display element 17B is explained.

As a blue light source, an LED is used. This is for reasons such as low risk to the eyes unlike a laser, a small contribution to brightness due to its low spectral luminous efficacy, and its long lifetime.

By using as an excitatory light source a blue laser which is easy to focus and collimate and by using an LED as a light source for projection, there is an effect that it is possible to reduce risks to the eyes while also maintaining the brightness of the lights.

The blue light emitted from the LED 19 impinges on a multiple reflection element 20 which is arranged directly thereafter. The blue light is reflected multiple times in the multiple reflection element 20 to become a light having a uniform illuminance distribution in the emission aperture plane of the multiple reflection element 20. The shape of the emergence aperture plane of the multiple reflection element 20 is a substantially similar figure to that of the liquid-crystal-type image display element 17B. The blue light emitted from the multiple reflection element 20 becomes substantially collimated in the collimating lens 15B and impinges on the incident side polarizer plate 16B. Since the light emitted from the LED is a light which is random in the polarization orientation, the X-polarized light is removed with the incident side polarizer plate 16B so that only the Y-polarized light passes through and impinges on the liquid-crystal-type image display element 17B.

Next, by each of liquid-crystal-type image display elements 17 (17R, 17Q and 17B) that constitute a light intensity modulation part, the light, of which the degree of polarization is increased by each of the incident side polarizer plates 16 (16R, 16Q and 16B) with the transmission axes in the Y direction, is modulated (the light intensity modulation) in response to a not-illustrated color image signal to form an optical image of the X-polarized light of blue or red color or that of the Z-polarized light of green color.

The optical images of the X-polarized lights of blue and red colors and the optical image of the Z-polarized light of green color formed in the way described above impinge on emergent side polarization plates 18 (18R, 18G and 18B), respectively. The emergent side polarization plates 18R and 18B are polarizer plates having the X direction as the transmission axis and the emergent side polarization plate 18G is a polarizer plate having the Z direction as the transmission axis. Therefore, the unnecessary polarized light components (here, Y-polarized light) are eliminated and the contrast is enhanced.

The optical images of the X-polarized lights of blue and red colors and the optical image of the Z-polarized light of green color formed in the way described above impinge on a cross dichroic prism 21 which is a color composition means. At this time, the optical image of the green light enters as the Z-polarized (P-polarized with respect to the dichroic film face of the cross dichroic prism 21) as is. On the other hand, in the optical paths of the blue light and the red light, there are provided half-wave plates, which are not illustrated, between the emergent side polarizer plates 18B and 18R and the cross dichroic prism 21; the optical images of the X-polarized blue and red lights impinge on the cross dichroic prism 21 after being converted into the optical images of the Y-polarized (S-polarized with respect to the dichroic film face carrying out the color composition in the cross dichroic prism 21). This is performed taking account of the spectral characteristics of the dichroic film; that is, by choosing the so-called SPS composition for which the green light is P-polarized and the red and blue lights are S-polarized the color composition is performed with high efficiency.

Next, as for the cross dichroic prism 21, a dichroic film (a dielectric multi-layer film) reflecting blue light and a dichroic film (a dielectric multi-layer film) reflecting red light are formed on the interfaces of the four right-angle prisms in substantially an "X" shape (a cross shape). The blue and red lights (the S-polarized lights with respect to the dichroic film faces) incident on the opposite incident faces among the three incident faces of the cross dichroic prism 21 are respectively reflected by the dichroic films for blue and red lights, which are crossed. Also, the green light (the P-polarized light with respect to the dichroic film faces) incident on the central incident face travels straight. The optical images of the lights of these colors are color-composed and a light of a colored image (a composite light) is emitted from the emergence face.

And then, the composed light emerging from the cross dichroic prism 21 is projected by a projection lens 22 like a zoom lens, for example, onto a transmission-type or projection-type screen 120 so that an magnified image is projected to be displayed.

Here, as an image display element, an explanation is given with an example of a liquid-crystal-type image display element; it is needless to say that the present invention can also be applied to a projection type image display apparatus using a DMD (Digital Mirror Device) element.

According to the present invention, it is possible to furnish a projection type image display apparatus which improves the lifetime of the fluorescent material light source without increasing in the size of the apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus, comprising:
    a cluster of excitatory light sources emitting excitatory light;
    a substrate on which a fluorescent material to emit fluorescent light by irradiation of the excitatory light is arranged;
    a first light intensity detector measuring the intensity of said excitatory light;
    a second light intensity detector measuring the intensity of said fluorescent light;
    a control device configured to:
        judge whether said substrate is to be moved or not based on the measured values of said first and second light intensity detectors, and
        provide instruction to a motion device based on the measures values of the first and second light intensity detectors, wherein:
    the motion device is configured to:
        rotate the substrate and fluorescent material in response to the instruction from said control device, and
        move the substrate and fluorescent material in a direction which is different from a direction of the rotating substrate and fluorescent material.

2. The projection type image display apparatus according to claim 1, wherein
    said control device issues an instruction to said motion device to move said substrate when the ratio of a decrease in the intensity of said fluorescent light to a decrease in the intensity of said excitatory light exceeds a prescribed value.

3. The projection type image display apparatus according to claim 2, wherein
    said motion device moves said substrate in a direction that is perpendicular to the direction of optical axis of said excitatory light incident on said substrate.

4. The projection type image display apparatus according to claim 3, wherein
    the face on the side of said substrate receiving said excitatory light comprises a fluorescent-material-free area to transmit said excitatory light.

5. The projection type image display apparatus according to claim 4, wherein:
    an area on which said fluorescent material is arranged includes an irradiation area on which said excitatory light is actually focused and,
    together with the fact that said area on which said fluorescent material is arranged is formed to have an annular shape, a width in the radial direction of said annular shape has a size which is capable of accommodating a plurality of said irradiation areas in said radial direction.

6. The projection type image display apparatus according to claim 5, further comprising
    an LED as a light source for projection onto a screen; and
    wherein said excitatory light source cluster comprises a blue laser.

7. The projection type image display apparatus according to claim 4,
    further comprising an LED as a light source for projection onto a screen; and
    wherein said excitatory light source cluster comprises a blue laser.

8. The projection type image display apparatus according to claim 3,
    further comprising an LED as a light source for projection onto a screen; and
    wherein said excitatory light source cluster comprises a blue laser.

9. The projection type image display apparatus according to claim 2, wherein
    the face on the side of said substrate receiving said excitatory light comprises a fluorescent-material-free area to transmit said excitatory light.

10. The projection type image display apparatus according to claim 9, wherein:
    an area on which said fluorescent material is arranged includes an irradiation area on which said excitatory light is actually focused and,
    together with the fact that said area on which said fluorescent material is arranged is formed to have an annular shape, a width in the radial direction of said annular shape has a size which is capable of accommodating a plurality of said irradiation areas in said radial direction.

11. The projection type image display apparatus according to claim 10,
    further comprising an LED as a light source for projection onto a screen; and
    wherein said excitatory light source cluster comprises a blue laser.

12. The projection type image display apparatus according to claim 9,
    further comprising an LED as a light source for projection onto a screen; and
    wherein said excitatory light source cluster comprises a blue laser.

13. The projection type image display apparatus according to claim 2,
    further comprising an LED as a light source for projection onto a screen; and
    wherein said excitatory light source cluster comprises a blue laser.

14. The projection type image display apparatus according to claim 1, wherein the face on the side of said substrate receiving said excitatory light comprises a fluorescent-material-free area to transmit said excitatory light.

15. The projection type image display apparatus according to claim 14, wherein:
    an area on which said fluorescent material is arranged includes an irradiation area on which said excitatory light is actually focused and,
    together with the fact that said area on which said fluorescent material is arranged is formed to have an annular shape, a width in the radial direction of said annular shape has a size which is capable of accommodating a plurality of said irradiation areas in said radial direction.

16. The projection type image display apparatus according to claim 15, further comprising an LED as a light source for projection onto a screen; and wherein said excitatory light source cluster comprises a blue laser.

17. The projection type image display apparatus according to claim 14, further comprising an LED as a light source for projection onto a screen; and wherein said excitatory light source cluster comprises a blue laser.

18. The projection type image display apparatus according to claim 1, further comprising an LED as a light source for projection onto a screen; and wherein said excitatory light source cluster comprises a blue laser.

\* \* \* \* \*